United States Patent [19]
Yang

[11] Patent Number: 5,093,723
[45] Date of Patent: Mar. 3, 1992

[54] METHOD OF 90 DEGREE PHASE-SHIFT MODULATION AND DEMODULATION USING PHASE LOCKED LOOP AND CIRCUIT THEREOF

[75] Inventor: Tae-Kwon Yang, Suweon-City, Rep. of Korea

[73] Assignee: Samsung Electronics Co., Ltd., Suweon, Rep. of Korea

[21] Appl. No.: 549,431

[22] Filed: Jul. 6, 1990

[30] Foreign Application Priority Data

Jul. 8, 1989 [KR] Rep. of Korea .................. 89-9747

[51] Int. Cl.$^5$ .............................................. H04N 7/08
[52] U.S. Cl. ...................................... 358/142; 358/23
[58] Field of Search ................... 358/23, 24, 25, 142, 358/21 V, 323

[56] References Cited

U.S. PATENT DOCUMENTS

| | | | |
|---|---|---|---|
| 3,609,223 | 9/1971 | Tajiri et al. | 358/323 |
| 4,626,928 | 12/1986 | Nagano | 358/23 |
| 4,668,997 | 5/1987 | Nagano et al. | 358/323 |
| 4,799,102 | 1/1989 | Kobayashi | 358/23 |
| 4,947,241 | 8/1990 | Basile et al. | 358/23 |

FOREIGN PATENT DOCUMENTS 0003387 1/1983 Japan .......................... 358/323

*Primary Examiner*—Victor R. Kostak
*Attorney, Agent, or Firm*—Cushman, Darby & Cushman

[57] ABSTRACT

A method for 90° phase-shift modulation and demodulation in a circuit having a PLL. A phase-shift of 90° between a main and an additional signal is provided. The method comprises the steps of: modulating by (a) selecting a specified position and inserting a pilot signal, (b) giving the phase-shift of 90° to an image carrier wave and (c) generating a modulated signal; and demodulating by (d) receiving the modulated signal and demodulating the main and additional signals having phase-shift of 90° to each other, (e) generating a frequency locked to the transmitted signal and controlling an output of a voltage controlled oscillator and reproducing the main and additional signals of step (d). By inserting the pilot signal into the overscanned interval of the horizontal line of the standard image signal and using it again as the reference signal of the remote PLL, the phase of the image carrier waves between the transmitter and receiver are locked to the same reference, so that phase error due to the 90° phase-shift modulation and demodulation is removed and the signal attenuation and crosstalk are prevented.

13 Claims, 8 Drawing Sheets

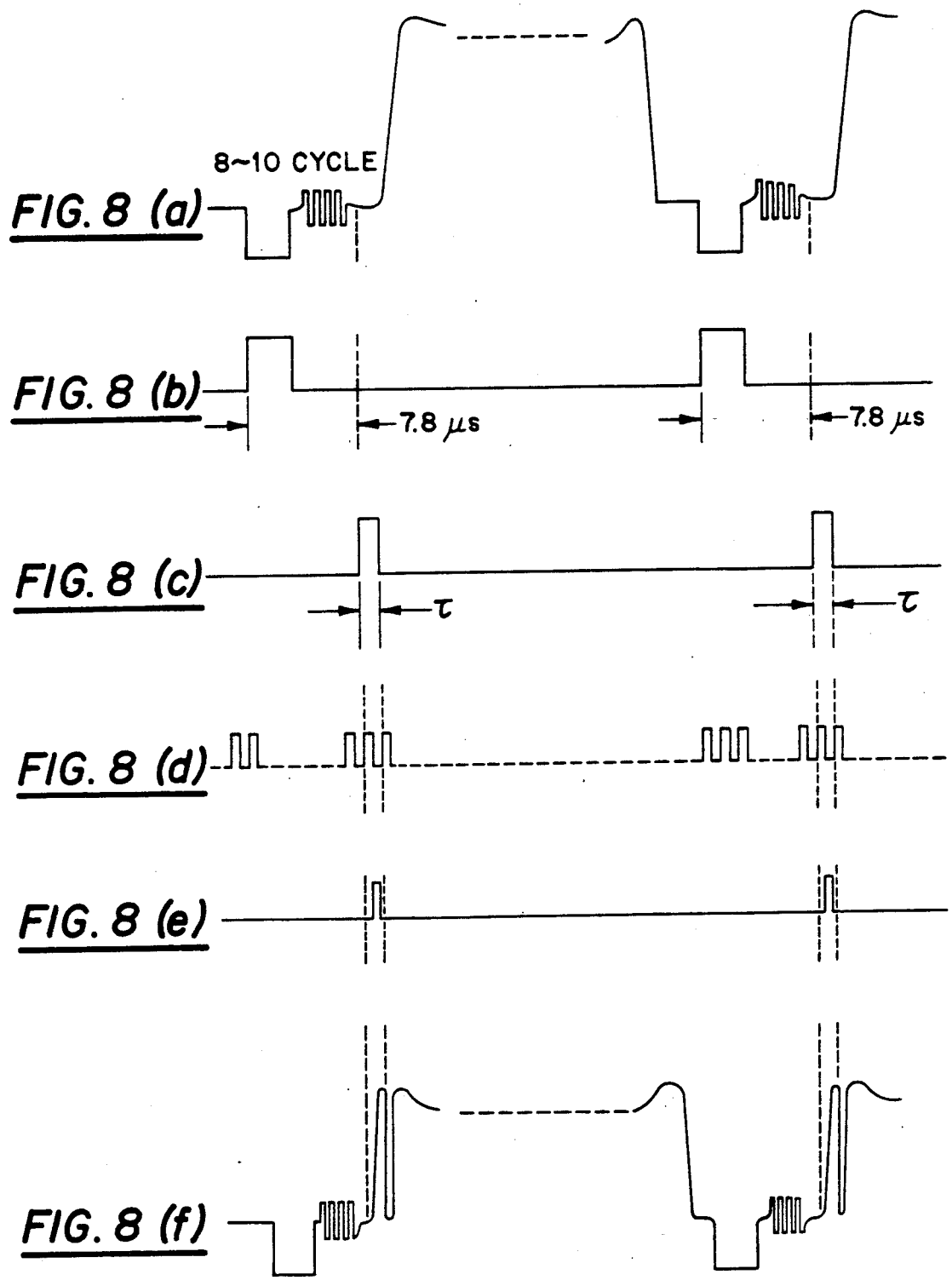

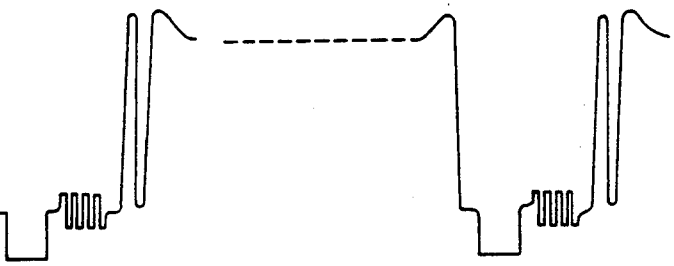
FIG. 9(a)
FIG. 9(b)
FIG. 9(c)
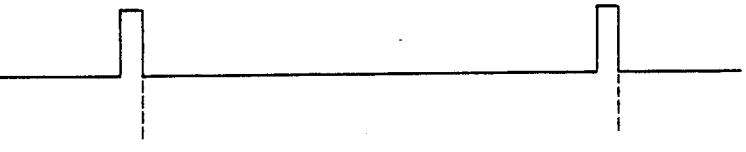
FIG. 9(d)
FIG. 9(e)
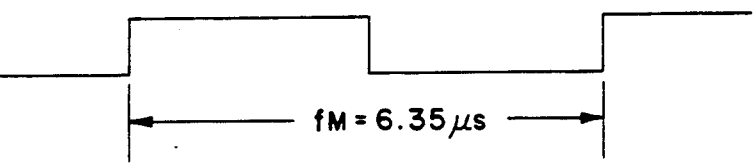
FIG. 9(f)

METHOD OF 90 DEGREE PHASE-SHIFT MODULATION AND DEMODULATION USING PHASE LOCKED LOOP AND CIRCUIT THEREOF

BACKGROUND OF THE INVENTION

1. Field of the Invention

The present invention relates to a high definition television (HDTV) for obtaining an image of higher definition by increasing scanning lines or bandwidth of an image signal. More particularly to a method of 90° phase-shift modulation and demodulation using a phase locked loop (PLL) and a circuit thereof a pilot signal is inserted to the overscan interval of a standard image signal. The phases of the image carrier waves between transmission and receipt are locked so as to be in the same phase. The pilot signal is used as a reference to remove the attenuation of a detected signal due to the phase error generated by a 90° phase-shift modulation during transmission and receipt crosstalk between channels is also significantly reduced.

Description of the Prior Art

Technologies for obtaining a good image of higher definition are constantly being developed in order to improve the definition of the conventional television employing conventional NTSC, SECAM or PAL systems, such technologies include improved definition (ID) system where the horizontal-to-vertical scanning ratio is changed from 2:1 to 1:1, extended definition (ED) system where the ghost image cancel function is added and the vertical and horizontal scanning lines are increased, and high definition (HD) system where high definition is realized by using a satellite broadcasting system HD system developments include the MUSE developed in Japan, HD-MAC under development in Europe and advanced television (ATV) compatible with the conventional NTSC system of the United States.

In ATV and EDTV systems, when an NTSC broadcasting wave is transmitted, a conventional composite image signal is transmitted through a first frequency band of 4.28 MHz. An additional signal for high definition is transmitted through a second frequency band of more than 4.28 MHz. As the signal occupying the first frequency band and the signal occupying the second frequency band are compressed, the signals are transmitted through the same frequency band with a phase-shift of 90°.

The receiver separates the fequencies, having the phase-shift of 90° to extract the main signal and the additional signal demodulated main signal is displayed on the screen in a conventional television. The demodulated additional signal improves the definition of the screen and is used as a high definition signal.

The 90° phase-shift modulation and demodulation method where main and additional signals are processed with a phase-shift of 90° can be used for HDTV technologies. The compression effect of a frequency band of a television signal of high definition can be multiplexed in a conventional image signal band.

In addition, when the TV has a wide vision as in an aspect ratio of 16:9, compared to a conventional aspect ratio of 4:3, the main signal at the center part and the additional signal at the side panel part are multiplexed and transmitted through the same signal band. The original signals are perfectly reproduced by accurate synchronous detection in the receiver.

Since a transmission channel used is common with the conventional television channel, the 90° phase-shift modulation and demodulation method is necessary in television systems such as EDTV or ATV.

FIG. 1 is a basic block diagram of a conventional 90° phase-shift modulator and demodulator.

The 90° phase-shift modulator/demodulator consists of a modulator part Ia in the transmitter and a demodulator part Ib in the receiver. To perform modulation and demodulation, the main and additional signals are transmitted along two carrier waves of like frequency having a phase difference of 90° to each other as shown in FIG. 1. The receiver multiplexes the two message signals in the same frequency band using 90° synchronous-detection. More particularly, in order to transmit a main signal $m_1(t)$ and an additional signal $m_2(t)$ through the same frequency band, the main and additional signals $m_1(t)$ and $m_2(t)$ are multiplied by carrier waves, $\cos\omega t$ and $\sin\omega t$, respectively, and are therefore 90° phase-shifted with respect to one another.

The transmitting signal Xc(t) is written as $$Xc(t) = m_1(t) \cos\omega t + m_2(t) \sin\omega t \quad (1)$$

At the receiver, the main signal $m_1(t)$ recovered by multiplying $2\cos\omega t$ by the transmitted signal Xr(t), becomes $$\begin{aligned} m_1'(t) &= Xr(t)2\cos\omega t \\ &= 2m_1(t)\cos^2\omega t + 2m_2(t)\cos\omega t\sin\omega t \\ &= 2m_1(t)\cdot\tfrac{1}{2}\cdot(1+\cos2\omega t) + 2m_2(t)\cdot\tfrac{1}{2}\sin2\omega t \\ &= m_1(t) + m_1(t)\cos2\omega t + m_2(t)\sin2\omega t \end{aligned} \quad (2)$$

Next, the equation (2) is applied to a low pass filter LPF 1, thereby leaving only the message signal and removing the carrier wave component, $$m_1'(t) = m_1(t) \quad (3)$$

The additional signal $m_2'(t)$ is similarly recovered as shown above.

$$\begin{aligned} m_2'(t) &= Xr(t)2\sin\omega t \\ &= m_1(t)\sin2\omega t + m_2(t) - m_2(t)\sin2\omega t \end{aligned} \quad (4)$$

Next, the equation (4) is applied to a low pass filter LPRF2, thereby removing the carrier wave component, as $$m_2'(t) = m_2(t) \quad (5)$$

FIG. 1 shows an ideal characteristic obtained by the synchronous-detection. Under normal conditions, there may be a phase error $\theta$ due to phase disagreement of between transmitted and received carrier waves as they are synchronous-detected through a transmitting channel. Hence phase unbalance and phase error occurs. Phase error, results in signal attenuation and crosstalk phenomena vector diagram of FIG. 2(b). In equation form the received main signal having phase error $\theta$ can be written as $$\begin{aligned} M_1(t) &= Xr(t)2\cos(\omega t + \theta) \\ &= m_1(t)[\cos\theta + \cos(2\omega t + \theta)] + m_2(t)[\sin(2\omega t + \theta) - \sin\theta] \end{aligned} \quad (6)$$

Applying equation (6) to low pass filter LPE 1 gives $$M_1(t) = M_1(t) \cos\theta - m_2(t) \sin\theta \qquad (7)$$

Similarly, considering equations (6) and (7), the received additional signal is given by $$M_2(t) = m_1(t) \sin\theta + m_2(t) \cos\theta \qquad (8)$$

Thus, first terms of the equations (7) and (8) represents the attenuation of the main signal $m_1(t)$ resulting from phase error $\theta$ shown in FIG. 2(b). The second term represents the crosstalk effect of $m_2(t)$ on $m_1(t)$ due to phase error $\theta$. Furthermore, the carrier frequency for the main signal in the receiver is unbalanced toward a positive phase $+\theta$ while the carrier frequency for the additional signal is unbalanced toward a negative phase $-\theta$ shown in FIG. 3(a), FIG. 3(b) shows the vector diagram thereof.

In FIG. 3(a), the main signal in the received signal $X_r(t)$ is demodulated by multiplying $2 \cos(\omega t + \theta)$ by $X_r(t)$ and is filtered by low pass filter LPF 1, thereby resulting in the following equation, $$Y_1(t) = m_1(t) \cos\theta - m_2(t) \sin\theta \qquad (9)$$

Similarly, the additional signal is demodulated by multiplying $2\sin(\omega t + \theta)$ by $X_r(t)$ and is filtered by low pass filter LPF 2, resulting in the following equation, $$Y_2(t) = m_2(t) \cos\theta - m_1(t) \sin\theta \qquad (10)$$

In equations (9) and (10), the $\cos\theta$ terms respresent the attenuation of each signal, while the $\sin\theta$ terms act as the crosstalk between neighboring channels. Similar to equations (7) and (8), equations (9) and (10) reveal that the phase unbalance can result in undesirable signal attenuation and distortion, possibly worse than attenuation from phase error. As a counterplan to reduce the phase error and phase unbalance, method of reducing the phase difference $\theta$ should be considered.

SUMMARY OF THE INVENTION

It is an object of present to provide a method of 90° phase-shift modulation and demodulation. A phase signal of a carrier wave in a transmitter, i.e. pilot signal, is inserted during a horizontal recovering time to reduce a phase error. The pilot signal is detected by a receiver applied to a PLL, thereby locking the phase of image carrier waves between transmitter and receiver.

Another object of the present invention is to provide a circuit of modulation and demodulation which reduces attenuation of a detected signal and a crosstalk between transmission and receipt of a signal by reproducing an image carrier wave of the receiver locked to that of a transmitter, thereby reducing phase error and phase unbalance.

According to the present invention, a method of 90° phase-shift modulation and demodulation is provided using a PLL, and having a phase-shift of 90° between a main and an additional signal. The method comprises the steps of: modulating by (a) selecting a specified position by detecting a horizontal synchronous signal from the main signal and inserting a pilot signal by synthesizing a divided image carrier wave at the specified position, (b) giving the phase-shift of 90° to the image carrier wave after time-compensation fo the additional signal and (c) generating a modulated signal by adding the additional signal modulated step (b) to the main signal modulated by step (a); and demodulating by (d) receiving the modulated signal and demodulating the main and additional signals which have a phase-shift of 90° with respect to each other, (e) generating a frequency locked to the transmitted signal by detecting the horizontal synchronous signal from the main signal for the phase comparison and controlling an output of a voltage controlled oscillator, and (f) reproducing the main and additional signals of step (d).

In addition, a circuit of 90° phase-shift modulation is provided using a PLL, shift of 90° between a main and an additional signal. The circuit comprises: pilot signal position control means for detecting a horizontal synchronous signal from the main signal and generating the pulse at a specified position; pilot signal generation means for generating a divided pulse by converting an image carrier wave, a first multiplier for producing the pilot signal by multiplying the output pulse of the pilot signal position control means by that of the pilot signal generation means; a first adder for adding the main signal passing by a buffer to the output of the first multiplier passing by a pulse waveform normalizer; a second multiplier for multiplying the output of the first adder by that of an image carrier wave generator; a third multiplier for multiplying a delayed additional signal through a time-compensator by the image carrier wave of a 90° phase-shifter; and a second adder for adding the output of the second multiplier to that of the third multiplier.

Further, there is provided a circuit for performing 90° phase-shift demodulation using a PLL. The circuit having fourth multiplier for multiplying the received modulated signal by a feedback level signal, a 90° phase-shifter for giving the phase difference of 90° against the level modulating signal provided to the fourth multiplier, a fifth multiplier for multiplying the received modulated signal by the output of the 90° phase-shifter, low pass filters for filtering the outputs of the fourth and fifth multipliers and buffers for providing the main and additional signals by buffering the outputs of the low pass filters. The circuit further compriser pilot signal position detection means connected between the low pass filter and the fourth multiplier for detecting the horizontal synchronous signal and pilot signal from the output of the low pass filter; oscillating frequency control means for generating the specified frequency by controlling the output of a voltage controlled oscillator according to an input voltage; a phase detector connected between the pilot signal position detection means and oscillating frequency control means for applying the compared result of the outputs of respective circuits to the oscillating frequency controller circuit.

BRIEF DESCRIPTION OF DRAWINGS

These and other objects, features, and advantages of the present invention will become more apparent from the following description of the preferred embodiments taken in conjunction with the accompanying drawings, in which:

FIGS. 8a-8f are operation diagrams of FIG. 4 according to the present invention.

FIGS. 9a-9f are operation diagrams of FIGS. 5 according to the present invention.

DETAILED DESCRIPTION OF THE PREFERRED EMBODIMENTS

The present invention will be now described in more detail with reference to accompanying drawings.

Figure 1:
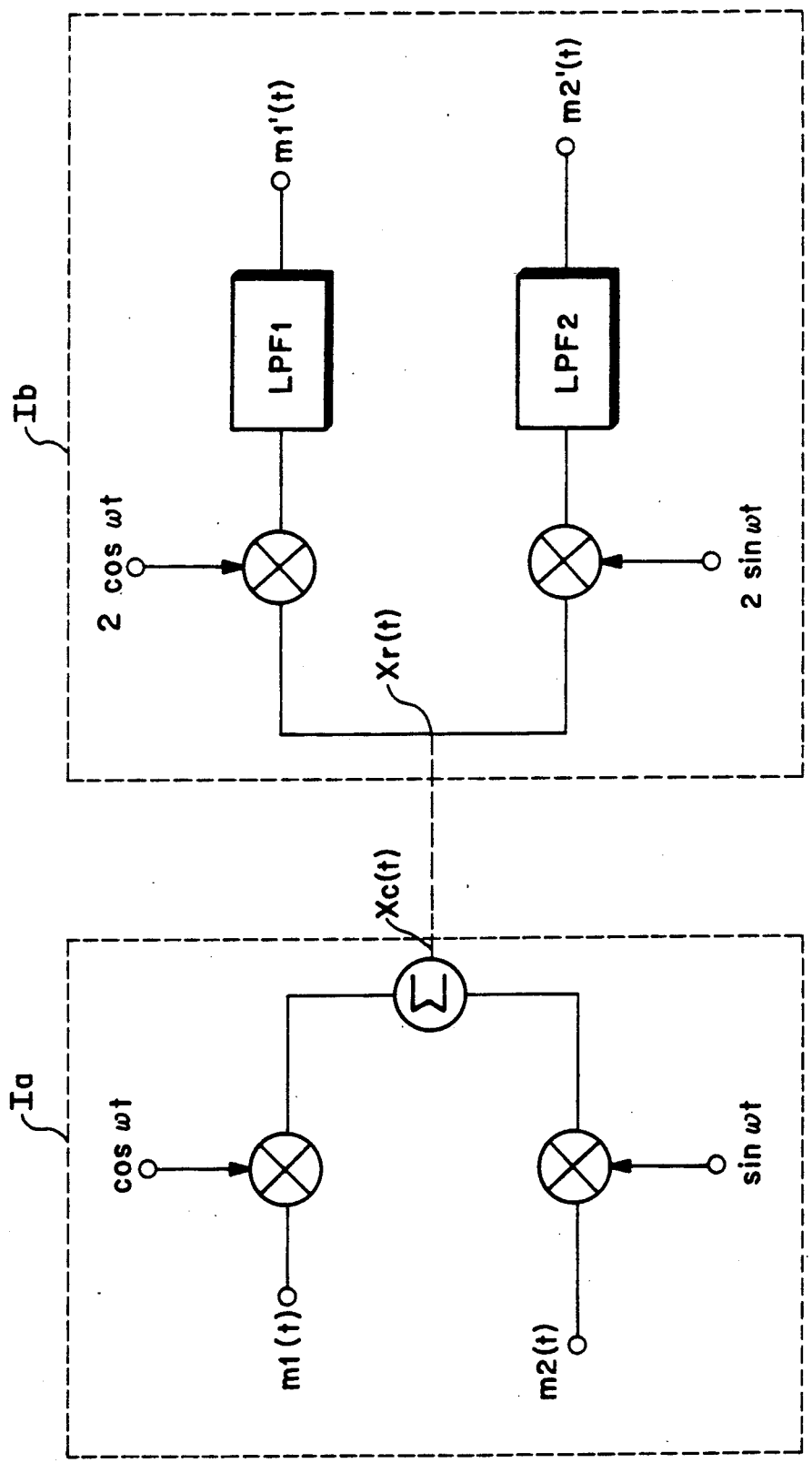
FIG. 1 is a basic diagram of the conventional 90° phase-shift modulation and demodulation circuit.
Figure 2A:
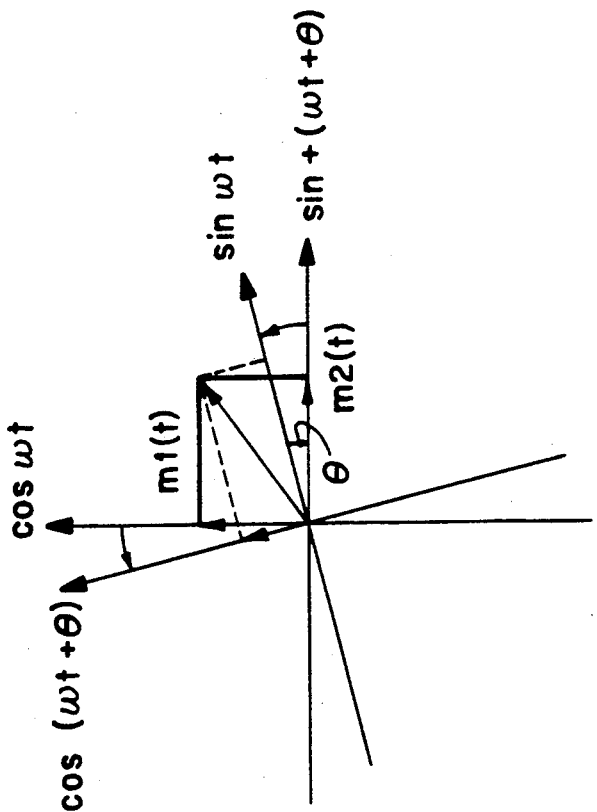
FIGS. 2a and 2b show the 90° phase-shift demodulator and its vector diagram under a phase error $\theta$.
Figure 2B:
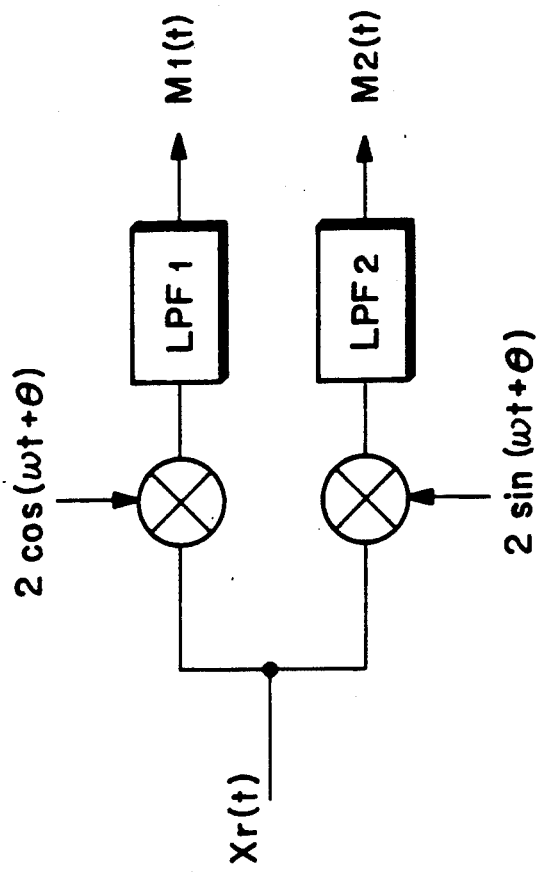
Figure 3B:
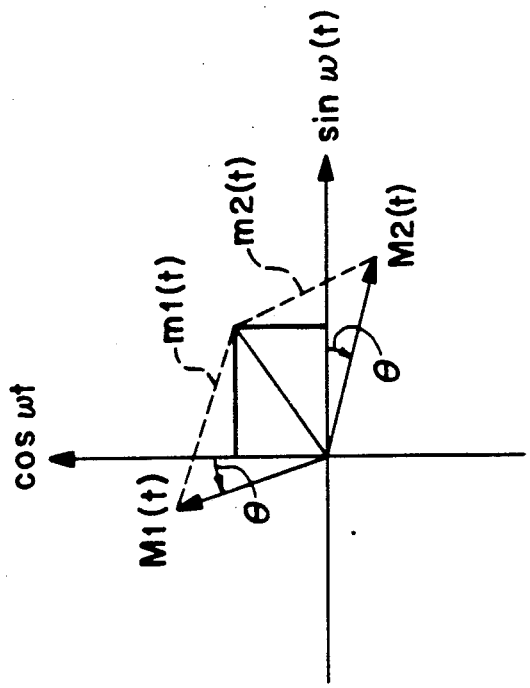
FIGS. 3a and 3b show the 90° phase-shift demodulator and its vector diagram under a phase unbalance.
Figure 3A:
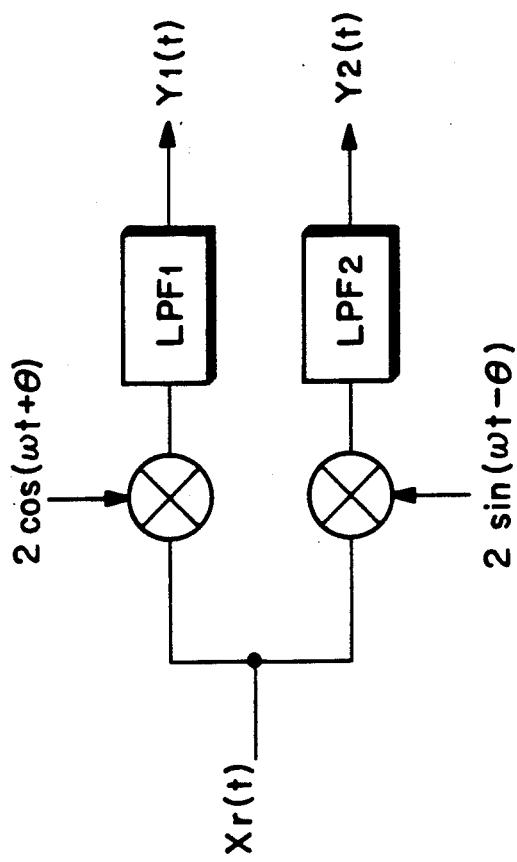
Figure 4:
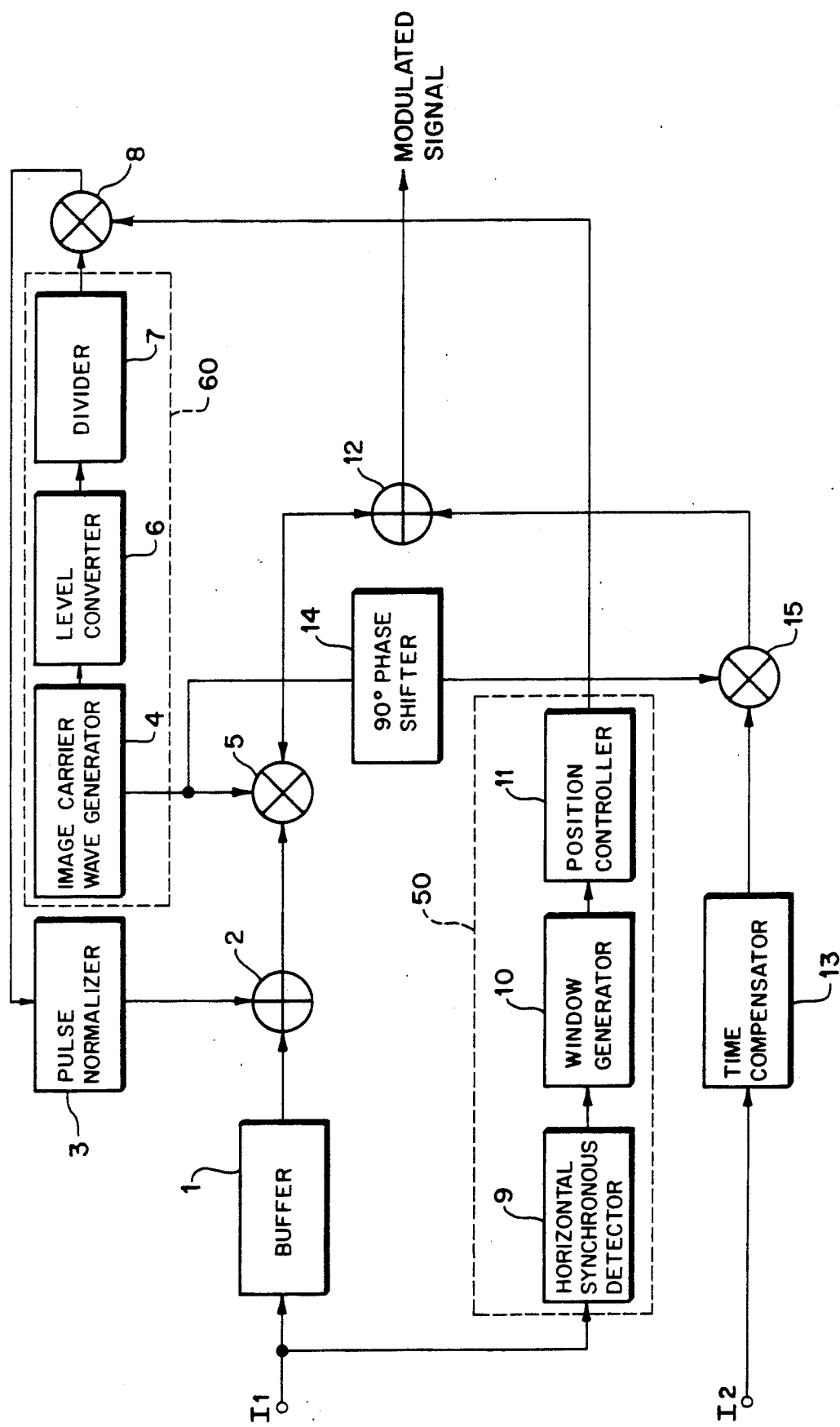
FIG. 4 is an embodiment of the 90° phase-shift modulator according to the present invention.

FIG. 4 shows an embodiment of the 90° phase-shift modulator according to the present invention.

A main signal $m_1(t)$ applied through an input terminal I1 is provided to a first adder 2 through a buffer 1, and is also provided to a pilot signal position controller 50. Next, the output of the pilot signal position controller 50 is multiplied by the output of a pilot signal generator 60 in a first multiplier 8. An output of the first multiplier is applied through a pulse normalizer 3 to the first adder 2 and the output of the first adder is multiplied by an output of the pilot signal generator 60 in a second multiplier 5.

Similarly, an additional signal $m_2(t)$ applied through another input terminal I2 is provided to a third multiplier 15 through a time compensator 13, thereby being multiplied by the image carrier wave applied through the 90° phase-shifter 29 from a reference signal generator. Finally, an output of the second multiplier 5 is added to an output of a third multiplier 15 by the second adder 12 to generate the modulated signal Xc(t).

The pilot signal position controller 50 includes a horizontal synchronous-detector 9 with transistors and resistors, and a window generator 10 with a monostable multivibrator, and a position controller 11 with a monostable multivibrator. The pilot signal generator 60 includes an image carrier wave generator 4 with a crystal oscillator, a level converter 6 for converting ECL level to TTL level, and a divider 7 with counters. The first and second multiplier 5 and 15, adders 2 and 12 are composed of the conventional gate circuits, while the time compensator 13 is composed of delay components.

Figure 5:
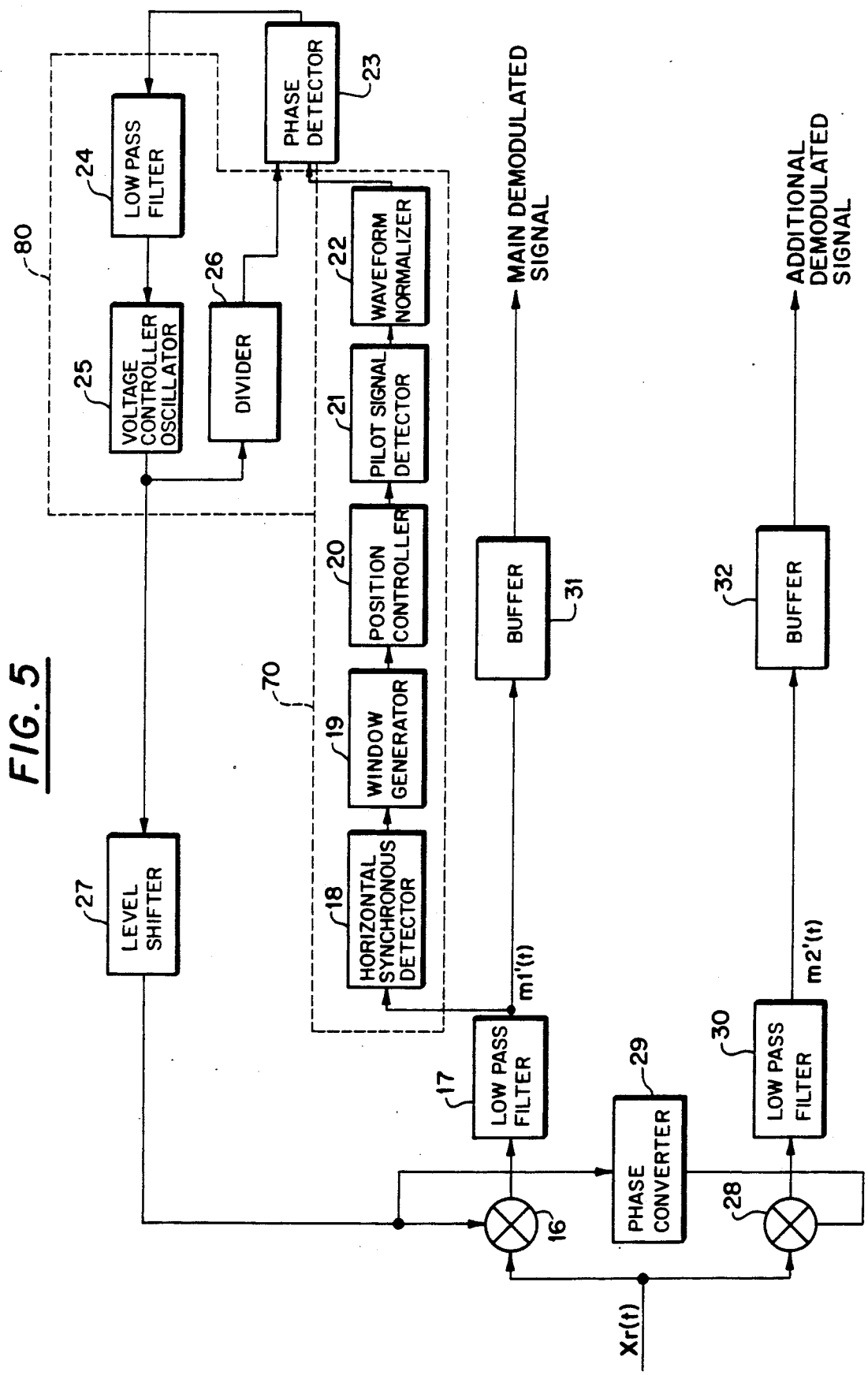
FIG. 5 is another embodiment of 90° degree phase-shift demodulator according to the present invention.

FIG. 5 shows an embodiment of the 90° phase-shift demodulator according to the present invention.

The modulated signal Xr(t) received by the receiver is applied to both fourth and fifth multipliers 16 and 28. Low pass filters 17, 30 and buffers 31, 32 are connected to the output terminals of the multipliers 16 and 28, respectively, to provide the demodulated main and additional signals. A pilot signal position detector 70 is connected between the low pass filter 17 and the buffer 31, and outputs of an oscillating frequency generator 80 and the pilot signal detector 70 are applied to a phase detector 23 including MC4044. The pilot signal position detector 70 includes a horizontal synchronous-detector 18 having transistors and resistors, a window generator 19 and a position controller 20 each having monostable multivibrator, and a pilot signal detector 21 and a waveform normalizer 22 having analog components. The oscillating frequency controller 80 includes a low pass filter 24 for filtering an output of the phase detector 23, a voltage controlled oscillator 25 oscillating according to a dc level filtered by the low pass filter 24, and a divider 26 for dividing the output of the voltage controlled oscillator 25 and applying the divided output to the phase detector 23.

Also, an output of the voltage controlled oscillator 25 is applied to the fourth multiplier 16 after its level is converted to the same one as the modulated signal received by the receiver and at the same time an output of a level shifter 27 is applied to the fifth multiplier 28 through the second 90° phase-shifter 29.

Figure 6:
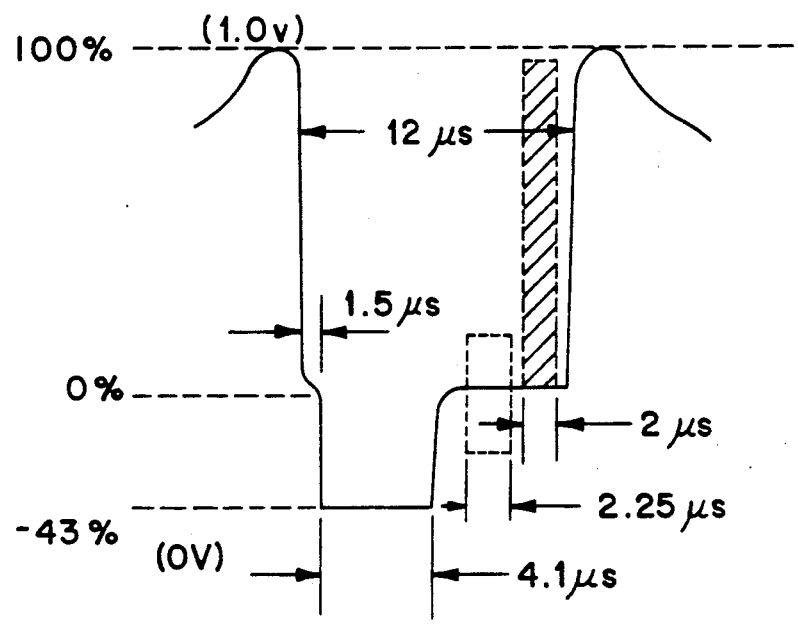
FIG. 6 is a waveform diagram representing a standard image level of a main signal.

FIG. 6 shows a waveform diagram of a standard image level as a television signal adised by CCIR and ICC.

Figure 7:
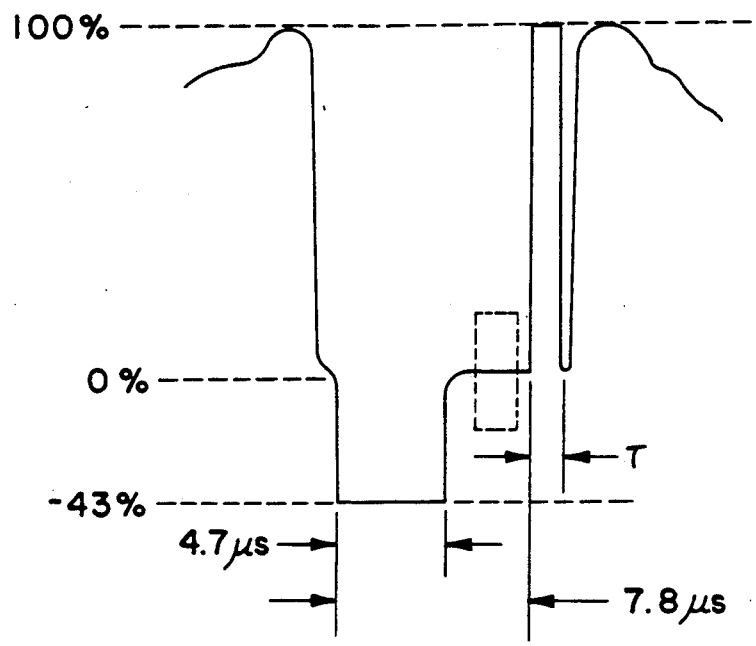
FIG. 7 is a waveform diagram representing a pilot signal for a phase detection according to the present invention.

FIG. 7 is a waveform diagram representing the insertion of a pilot signal for a phase detection into an overscanning interval of a horizontal line of a standard image signal.

FIG. 8 shows an operation waveform diagram of FIG. 4, where (8a) represents a waveform of the main signal as the standard television signal, (8b) represents a horizontal synchronous signal detected from the waveforms (8a),(8c) represents the control signal for detection of only the pilot pulse which is made by shifting the position of the horizontal synchronous signal, i.e. the signal (8b), as much as 7.8 μs and reducing its width to τ. Subsequently, (8d) is the output waveform of the divider 7 in FIG. 4 which makes only one pulse transmitted during the time interval τ by dividing the output of carrier wave oscillator to be in the range of 680 KHz to 2 MHz, and (8e) is the output of the first multiplier 8 in FIG. 4 which is extracted from the product of the control signal (8c) by the waveform (8d). (8f) is a final modulated signal which is made by synthesizing (8e) to (8a) after shifting the level of (8e).

FIG. 9 shows an operation waveform diagram of FIG. 5, where (9a) is a synchronous-detected waveform of signal (8f) in FIG. 8 through the transmission channel. (9b) and (9c) are the horizontal synchronous-detection and window generation signal and the position control signal, respectively, and (9d) and is pilot signal which is detected from the product of signal (9a) by (9c). (9d) is the same as signal (8e). (9e) is a normalized waveform by extending signal (9d) used as a reference signal of the phase detector 23 in FIG. 5. (9f) is the output waveform of the voltage controlled oscillator 25 in FIG. 5 which is locked to (8d) in FIG. 8. Thus, (8d) and (9f) are waveforms with the same phase, being remotely locked by the PLL.

The present invention will now be explained by referring to FIG. 4 to FIG. 9.

The horizontal synchronous signal (8d) is detected from the main signal $m_1(t)$ in FIG. 4, i.e. the waveform (8a) by the horizontal synchronous-detector 9, and subsequently the output pulse (8c) is generated by the window generator 10 and position controller 11 in FIG. 4. This signal acts as the control signal for the insertion of the pilot signal.

Similarly, the main signal $m_1(t)$ passing through the buffer 1 is added to the pilot signal provided through the pulse waveform normalizer by the first adder 2 to generate the waveform in the waveform (8f). Next, the added waveform (8f) is applied to the second multiplier 5 and is subsequently applied to the second adder after it is modulated by the output of the image carrier wave generator 4 in the second multiplier 5. The carrier wave of the image carrier wave generator 4 is converted to the proper level by the level converter 6 and the dividing number of the divider 7 which divides the frequency of the image carrier wave. This number should be correctly selected so that the output period of the divider is in the range of 0.5 μs to 1.5 μs and the output frequency of the divider becomes 1/n(n; integer) times that of the image carrier wave. The reason why the dividing number of the divider should be selected to satify such conditions is that only one pulse must be inserted during the pilot signal insertion interval of 2 μs and its frequency must be within the pass region of the low pass filter 17 shown in FIG. 15.

The output of the position controller 11, namely the pilot insertion interval pulse (8c), is then multiplied by the output signal (8d) of the divider 7 in the first multiplier 8, thereby producing the pilot pulse waveform (8e). This pilot pulse signal is converted to the proper level by the pulse waveform normalizer 3 to be synthesized with the main signal, and generate the final waveforms (8f).

Similarly, the additional signal m$_2$(t) is applied to the third multiplier 15 after it is compensated by as much as the signal process time of main signal m$_1$(t) by the time-compensator 13. After the time-compensated additional signal is modulated by the output of the first 90° phase-shifter 14 consisting of a differentiator circuit with resistor and capacitor (not shown in figure) of which the output phase differs as much as 90° from that of the image carrier generator 4, the modulated additional signal is added to the modulated main signal by the second adder 12.

At this time, the phase angle $\theta$ of the phase-shifter 14 should satisfy the following formula.

$$\theta = \tan^{-1} \frac{1}{\omega CR}$$

where, $\theta$ is of course 90° and the capacitance value should be selected in the range of 10 PF to 50 PF and the resistance value is automatically determined by the above formula. The modulated main signal m$_1$(t) and additional signal m$_2$(t) are orthogonal, that is, the phase difference is 90° so that they are multiplexed in the same signal frequency band without crosstalk of the two channels.

The modulated output in FIG. 4 is provided as the received signal Xr(t) to the receiver through the transmission channel.

The received signal Xr(t) as shown in the signal (9a) is multiplied by the output of the voltage controlled oscillator 25 of which frequency is the same as that of the image carrier wave in the transmitter in the fourth multiplier. The multiplied output, that is, demodulated signal is filtered by the low pass filter 17 so that the main signal m$_1$'(t) is detected. Similarly, the additional signal m$_2$'(t) is demodulated by multiplying Xr(t) by the output of the second 90° phase-shifter 29 and filtering the multiplied signal by the low pass filter 30. Next, the main and additional signals are provided through the buffers 31 and 32, respectively. The level converter 27 is for increasing the amplitude of the carrier waves, i.e. cos ωt and sinωt by two times since the received level is reduced to half the transmitted level during the demodulation if it is not increased by two times.

As mentioned before, the point of the present invention is to reduce the phase error $\theta$. First, the horizontal synchronous-detector 18 detects the horizontal synchronous signal (9b) from the main signal m$_1$(t) filtered by the low pass filter 17. Next, the synchronous signal (9b) is changed to the waveform (8c) by the window generator 19 and position controller 20, and the pilot signal (9d) is detected by the pilot signal detector 21. In order to drive correctly the PLL, the duty cycle of the signal (9b) is increased by the waveform normalizer 22, thereby producing the signal (9e) which is used as a reference signal of the phase detector 23. After the output of the voltage controlled oscillator 25 is divided by the divider 26, the divided output is applied to the phase detector 23. Then, the phase difference between the divided output of the voltage controlled oscillator 25 and the reference signal of the phase detector 23 corresponding to the output of the waveform normalizer 22 is detected. Subsequently, the detected signal is applied to a varactor diode in the voltage controlled oscillator 25 after being smoothed a dc signal by the low pass filter 24, so that the phase error becomes more and more reduced and at last it is locked to the same phase. Ultimately, the phases of the image carrier waves in the transmitter and receiver are locked with each other by remote PLL, hence the attenuation of the signal and crosstalk due to phase error and phase unbalance are removed.

In summary, by inserting the pilot signal into the overscanned interval of the horizontal line of the standard image signal and using the pilot signal as the reference signal of the remote PLL, the phases of the image carrier waves between the transmitter and receiver are locked to the same reference. The phase error due to the 90° phase-shift modulation and demodulation is removed and the signal attenuation and crosstalk are then removed at the same time.

The present invention is described in the limited range of a main signal as applied to the composite image signal of an NTSC broadcasting system. An additional signal is applied as the information signal for high definition of an image signal in the television system for reproducing the image of high definition. In the case of teletext broadcasting or character multiplex broadcasting system, the image signal may be applied as the main signal and the text signal for the characters may be applied as the additional signal.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An apparatus for 90° phase-shift modulation of a main signal and an additional signal, the apparatus comprising:
   pilot signal position control means for detecting the position of a horizontal synchronous signal included in the main signal and generating a sync signal having a pulse at a predetermined distance relative to the position of said horizontal synchronous signal;
   pilot signal generation means for generating a divided pulse signal by converting an image carrier wave into divisible pulse waves;
   a first multiplier for generating a pilot signal by multiplying the sync signal from the pilot signal position control means and the divided pulse signal from the pilot signal generation means;
   a first adder for adding the main signal and the pilot signal;

a second multiplier for multiplying the output of the first adder and image carrier wave from an image carrier wave generator;

a time-compensator for delaying the process for modulating the additional signal;

a phase-shifter for phase-shifting the image carrier wave;

a third multiplier for multiplying the delayed additional signal and the phase-shifted image carrier wave; and, a second adder for adding the output of the second multiplier and the output of the third multiplier.

2. A modulation circuit according to claim 1, wherein the pilot signal position control means comprises:

a horizontal synchronous detector for detecting the horizontal synchronous signal included in the main signal and generating a response signal thereto; and, a sync signal generator means for generating the sync signal at a fixed time after receiving the response signal from the horizontal synchronous detector 3. A modulation circuit according to claim 1, wherein the pilot signal generation means comprises:

an image carrier wave generator for providing the modulating carrier wave;

a level converter, connected to the image carrier wave generator, for converting ECL level to TTL level; and, a divider, connected to the level converter, for dividing the output of the level converter into a divisible wave signal having a constant frequency.

4. An apparatus for demodulating a first signal and a second signal from a multiplexed modulated signal, the multiplexed modulated signal including a first modulated signal and a second modulated signal, the first and second modulated signals being 90° out of phase and corresponding to said first and second signals respectively, the apparatus comprising:

a first multiplier means for generating a first demodulated signal corresponding to the first signal by multiplying the multiplexed modulated signal and a feedback image carrier wave from an oscillating frequency control means;

phase-shifting means, for shifting the feedback image carrier wave by 90°;

second multiplier means for generating a second demodulated signal by multiplying the multiplexed modulated signal and the output of the phase-shifting means;

pilot signal position detection means for detecting a pilot signal from the first demodulated signal and for generating a reference signal;

phase detection means for receiving the reference signal and the feedback image carrier wave from said oscillating frequency control means; and, wherein said phase detection means provides a feedback signal to the oscillating frequency control means until a phase lock has been detected.

5. The apparatus of claim 4, wherein the pilot signal position detection means comprises:

a phase synchronous detector for detecting the horizontal synchronous signal included in the first demodulated signal and generating a response thereto;

a sync signal generator means for generating a constant width pulse signal at a fixed time after receiving the response signal from the horizontal synchronous detector;

a pilot signal detector responsive to the constant width pulse signal for detecting the pilot signal included in the first demodulated signal; and, a waveform normalizer connected to the pilot signal detector for increasing the duty cycle of the pilot signal.

6. The apparatus of claim 4, wherein said oscillating frequency control means comprises:

a low pass filter for converting to a DC voltage a phase-detected level from the phase detection means;

a voltage controlled oscillator for outputting the feedback image carrier wave at a frequency determined by the DC voltage; and, a divider for dividing the feedback image carrier wave from the voltage controlled oscillator and outputting the divided signal detection to the phase detection means.

7. A method, in a circuit having a PLL, for performing phase-shift modulation and demodulation on a first signal and a second signal using an image carrier wave, the method comprises the steps of:

modulating said first and second signals, said modulating step further comprises the steps of:
(a) detecting the position of a horizontal synchronous signal included in said first signal;
(b) selecting a pilot signal position relative to the position of the horizontal synchronous signal;
(c) generating a divided image carrier wave from said image carrier wave and said pilot signal position;
(d) inserting a pilot signal at said pilot signal position by synthesizing said divided image carrier wave and said first signal;
(e) phase-shifting by 90° the divided image carrier wave;
(f) time-compensating said second signal;
(g) modulating said time-compensated second signal and said phase-shifted divided image carrier wave to generate a second modulated signal; and
(h) adding the first modulated signal and the second modulated signal to form a multiplexed modulated signal; and, demodulating said first and second signals, said demodulating step comprising the steps of:
(a) receiving the multiplexed modulated signal;
(b) demodulating the first and second signals phase-shifted 90° from each other;
(c) detecting the horizontal synchronous signal along said first signal and generating a reference signal;
(d) controlling the output of a voltage controlled oscillator in response to said reference signal to generate a frequency locked to the frequency of the image carrier wave of said modulating step;
(e) reproducing the first and second demodulated signals in response to the frequency output by said voltage controlled oscillator.

8. The method of claim 7, wherein said pilot signal is positioned 7.8 $\mu$s after the rising edge of the horizontal synchronous signal is detected.

9. The method of claim 7, wherein said pilot signal has a pulse width of less than 0.2 $\mu$s.

10. A method for performing phase-shift modulation on a first signal and a second signal using an image carrier wave, the method comprises the steps of:

detecting the position of a horizontal synchronous signal included in said first signal;

selecting a pilot signal position relative to the position of the horizontal synchronous signal;

generating a divided image carrier wave from said image carrier wave and said pilot signal position;

inserting a pilot signal at said pilot signal position by synthesizing said divided image carrier wave and said first signal;

phase-shifting by 90° the divided image carrier wave;

time-compensating said second signal;

modulating said time-compensated second signal and said phase-shifted divided image carrier wave to generate a second modulated signal; and, adding the first modulated signal and the second modulated signal to form a multiplexed modulated signal.

11. The method of claim 10, wherein said pilot signal is positioned 7.8 μs after the rising edge of the horizontal synchronous signal is detected.

12. The method of claim 10, wherein said pilot signal has a pulse width of less than 0.2 μs.

13. A method, in a circuit having a PLL, for demodulating a first signal and a second signal from a multiplexed modulated signal including a first modulated signal and a second modulated signal, the first and second modulated signals being 90° out of phase and corresponding to the first and second signals respectively, the method comprising the steps of:

receiving the multiplexed modulated signal;

demodulating the first and second signals;

detecting the horizontal synchronous signal included in said first signal and generating a reference signal;

controlling the output of a voltage controlled oscillator in response to said reference signal to generate a feedback image carrier wave, wherein the feedback image carrier wave is phase-locked to a signal corresponding to the initial image carrier wave used for modulation of the first modulated signal; and, reproducing the first and second demodulated signals in response to the feedback image carrier wave output by said voltage controlled oscillator.

* * * * *